March 21, 1950     M. CASERTA     2,501,121
VALVE
Filed Aug. 8, 1945
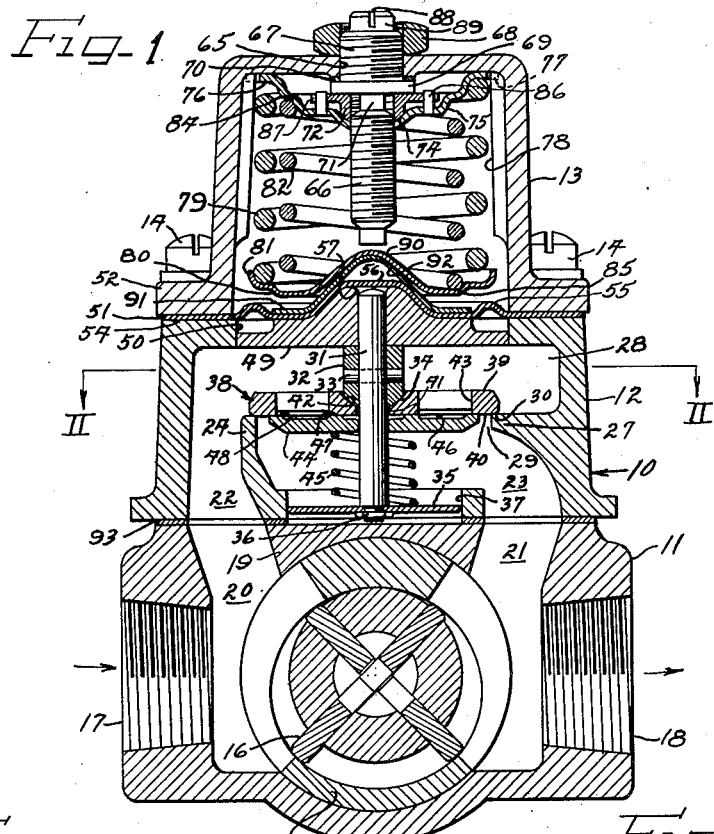
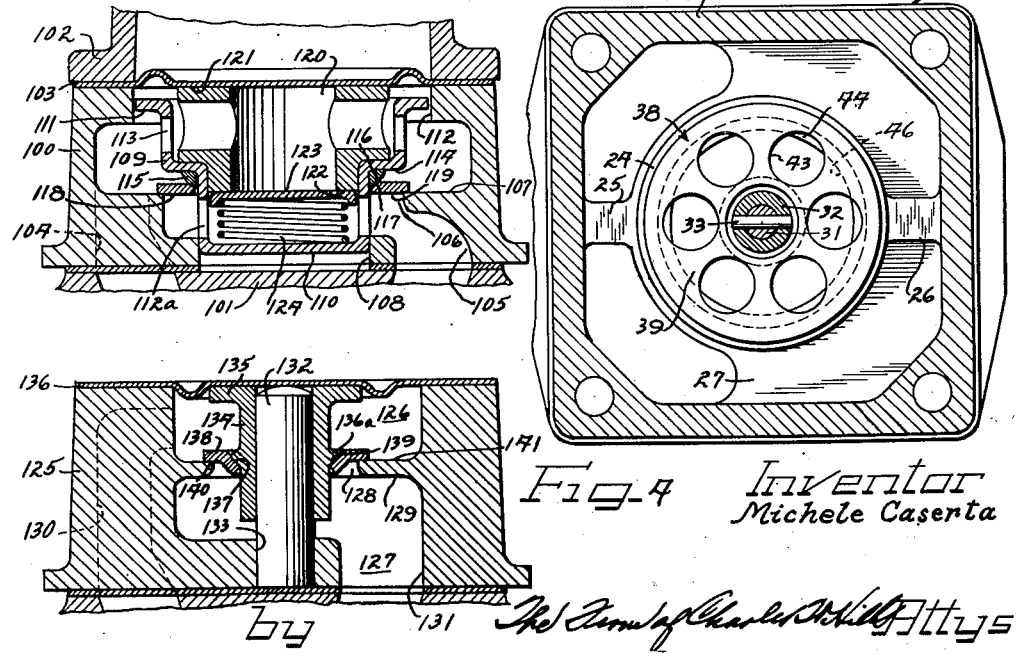
Inventor
Michele Caserta Patented Mar. 21, 1950

2,501,121

UNITED STATES PATENT OFFICE 2,501,121

VALVE

Michele Caserta, Detroit, Mich.

Application August 8, 1945, Serial No. 609,553

2 Claims. (Cl. 277—45)

This invention relates to a valve and more particularly to a relief valve assembly for use in pumps or other fluid transfer devices.

According to the present invention, the relief valve structure is so designed and arranged as to insure proper seating of the relief valve disk or ring when the valve is free to close, regardless of whether the associated part of the relief valve structure is properly aligned or slightly "cocked." This result is accomplished through the use of cooperating surfaces capable of permitting relative tilting movement between the associated parts of the valve assembly.

The relief valve assembly of my present invention is thus so constructed as to eliminate the necessity of extremely close tolerances in the dimensions of the associated parts.

It is therefore an important object of my invention to provide a novel and improved relief valve construction whereby ease, certainty and sensitivity of operation are assured, and any danger of the relief valve being improperly or incompletely seated upon closing of the valve is eliminated.

It is a further important object of this invention to provide a simple, yet rugged construction of valve that is easy to manufacture and that performs satisfactorily under high speed operating conditions with a minimum of wear upon the parts and therefore a long life of usefulness.

Other and further important objects of this invention will be apparent from the disclosures in the specification and the accompanying drawings.

On the drawings:

Figure 1 is a vertical sectional view through a pump and valve assembly embodying the principles of my invention;

Figure 2 is a sectional view taken substantially along the line II—II of Figure 1;

Figure 3 is a fragmentary sectional view illustrating a modified form of my invention for use in a valve and pump assembly similar to that of Figure 1; and Figure 4 is a fragmentary sectional view of a further modified form of my invention for use in a somewhat different form of valve and pump assembly from that shown in Figure 1.

As shown on the drawings:

The reference numeral 10 indicates generally a fuel transfer mechanism, such as an aircraft fuel pump, with which is associated a relief and by-pass valve assembly of my invention. Said pump comprises a pump casing 11, a valve housing 12 mounted thereon, and a valve housing cover 13 secured to said housing 12 and to the pump casing 11 by means of bolts 14. The pump here illustrated is of the rotary vane type, the bore of the pump casing 11 being provided with a liner 15, within which a rotor 16 is adapted to be driven. The pump casing 11 is provided with an intake 17 and with an outlet 18 for connecting the pump in a fuel line to an engine, or to any other point to which fuel is to be delivered. Internally, the pump casing is divided by a transverse partition 19, on the intake side of which is formed a port 20 and on the outlet side of which is formed a port 21, both of which are in flow communication with interior passages 22 and 23, respectively, of the valve housing 12.

Said valve housing 12 is formed with an axially concentric, annular partition 24, which, as best shown in Figure 2, is integrally cast with the valve housing 12, to which it is connected by diametrally opposed vertical web portions 25 and 26. A horizontally extending web 27 connects said pump housing to somewhat more than one-half of the periphery of said annular partition on the outlet side of said housing to provide an upper chamber 28, between which and the passage 23 is a port 29 defined by the upper edge of the vertical partition 24 and the cooperating portion of the horizontal partition 27. Said port 29 is provided with an upper, plane seating surface 30.

The relief and by-pass valve assembly comprises a cylindrical rod or stem 31 mounted co-axially with respect to the port 29 for movement therein. Said stem 31 has attached thereto a collar 32, as by means of a pin 33 that passes through the collar and stem intermediate the length of the stem. The lower end of the collar 32 is provided with a segmental spherical surface 34 for a purpose that will later appear. A disk 35 is secured to the lower end of the stem 31, as by means of a nut 36, and is received within a cylindrical bore 37 formed in the lower end of the annular partition 24. Said disk 35 fits relatively snugly within the cylindrical bore 37 to afford a dash-pot action that serves to dampen the movement of said stem 31 and the associated valve members, indicated generally by the reference numeral 38, Said valve members 38 comprise a relief valve disk 39 having a lower plane face 40 adapted at its periphery to seat upon the seating surface 30. Said relief valve disk 39 is provided with a bore 41 of slightly larger diameter than the external diameter of the stem 31, thereby providing a clearance that permits relative angular movement between the relief valve disk and the stem. Said relief valve disk 39 is further provided about the bore 41 with a segmental spherical surface 42 for cooperation with the segmental spherical surface 34 to permit relative tilting movement of the relief valve disk 39 and the stem 31. By virtue of this relative tilting movement, as will hereafter be explained, the forces tending to seat the relief valve disk 39 are resolved into coaxial components only, thereby insuring proper seating between the plane surfaces 30 and 40.

The relief valve disk 39 is provided with a plurality of openings 43 arranged in a circle to provide a passage through said relief valve disk to by-pass the pump when the rotor 16 is not operating. This by-passage is normally closed by a by-pass valve 44 mounted upon the stem 31 beneath said relief valve disk 39 and normally held against the underside of said relief valve disk by a coiled spring 45 held under compression between the disk 35 and the underside of the by-pass valve 44. Said by-pass disk 44 is provided on its upper surface with an annular groove 46 forming inner and outer annular plane seating surfaces 47 and 48 adapted to seat against the undering surface 40 of said relief valve disk 39. The by-pass disk 44, therefore, normally closes the passage provided by the openings 43 and uncovers the passages only when the pressure is greater on the intake side of the pump than on the discharge side, a condition that would occur only when the pump is not running.

A disk 49 is mounted upon the upper end of the stem 31 for movement with said stem. Said disk 49 fits snugly within a cylindrical bore 50 formed within the upper wall of the valve housing 12. Accordingly, the disk 49 in cooperation with the cylindrical bore 50 serves as a guide for the upper end of the stem 31, while the lower disk 35 within the cylindrical bore 37 serves as a guide for the lower end of said stem 31 to maintain the stem always in vertical alignment.

The cover 13 houses pressure regulating mechanisms, which will now be described. A flexible diaphragm 51 is clamped about its periphery between the lower flanged end 52 of said cover 13 and the upper wall 54 of the valve housing 12. Said diaphragm 51 may suitably be formed of a natural or synthetic rubber composition and is preferably molded with an annular corrugation 55 adapted to lie just inside of the clamping surfaces of the lower flanged portion 52 and the upper valve housing wall 54. Said diaphragm 51 is further provided with a central, frusto-conical portion 56 that is adapted to conform with a similarly contoured central portion 57 formed on the disk 49.

The top wall of the cover 13 is provided with a central threaded opening 65. A relief pressure regulating mechanism is housed within said cover 13 and comprises a pressure adjusting member 66 having an upper threaded end 67 extending through said threaded opening 65. An upper projecting portion of said pressure adjusting member 66 is provided with an external nut 68 for holding said pressure adjusting member in the desired position. Beneath the upper threaded end 67, the pressure adjustment member 66 is provided with an integrally formed annular enlargement or collar 69, between which and the under side of the top wall of the cap 13 is positioned a sealing gasket 70. Said pressure adjustment member 66 is further provided with a reduced portion 71, positioned immediately below the collar 69, for receiving a flanged nut washer 72. Said nut washer 72 is provided with a threaded bore for engagement with the threaded portion of said pressure adjusting member 66 for axial movement therealong. The lower surface of said nut washer 72 is provided with a segmental spherical portion 74 for cooperation with a similar segmental spherical bearing surface formed on a spring retaining washer 75.

Said washer 75, which may suitably be formed from a metal stamping, is provided with an upper outer annular flange 76, which is recessed, as at 77, at diametrically spaced points about its periphery for receiving vertical guiding ribs 78 that are formed on the inner wall of the cover 13. The washer 74 is thus prevented by the interengagement of the ribs 78 in the recesses 77 from turning movement as the pressure adjustment member 66 is turned.

A relatively heavy coiled spring 79 is positioned coaxially about the pressure adjustment member 66 with its upper turn bearing against the annular flange 76 of said washer 75. The lower end of the spring 79 bears against a bottom washer 80 having an upwardly turned peripheral flange 81 for receiving said bottom turn of the spring 79. An inner oppositely coiled spring 82 is similarly held under compression between the upper washer 75 and the lower washer 80, with respective end turns of said spring positioned in grooves 84 and 85 formed for the purpose in said washers.

The upper disk washer 75 is provided with upwardly struck ears 86 which extend into peripheral slots 87 formed in the nut washer 72. Thus, the nut washer 72 is held against relative rotation and is confined to axial movement along the threaded adjusting member 66 when the latter is turned, as by means of a screw driver inserted into the kerf 88 in its upper projecting end 89.

The lower disk washer 80 is provided with an upwardly convex, segmental spherical central portion 90. A second bottom washer 91 is positioned beneath said lower disk washer 80 and over the flexible diaphragm 51. Said second bottom washer 91 has a central portion 92 that conforms with the segmental spherical portion 90 on the lower washer 80 to provide for relative swiveling and tilting movements therebetween. By reason of this arrangement only the axial components of the compression forces of the springs 82 and 79 are transmitted through the washers 80 and 91, and the diaphragm 51, to the disk 49. Any tendency of the springs 79 and 82 to become cocked, or to exert torsional forces during compression or expansion, is compensated for by the provision of the upper and lower spherical seats for the upper and lower washers 75 and 80, respectively. By reason of this construction, therefore, the pressure adjustment member 66 can be so adjusted as to give the desired amount of pressure upon the relief valve with the certain knowledge that the relief valve will remain closed until that amount of pressure is exceeded.

In assembling the valve housing 12 upon the pump casing 11, a gasket 93 is inserted between the adjacent surfaces on the housing and casing to provide a seal therebetween. Said gasket also serves to provide a seal between the under surface of the annular partition 24 and the upper surface of the partition 19 in the pump casing 11.

In normal operation, the pump rotor 16 takes fluid in through the intake 17 and discharges it through the outlet 18. The amount of compression impressed upon the springs 79 and 82 by the adjustment of the pressure adjusting member 66 determines the pressure at the outlet side of the rotor 16. When that pressure is exceeded, fluid at the outlet side of said rotor passes from the chamber 21 upwardly into the vertical passage 23 against the under side 40 of the annular relief valve ring 39, thereby causing said ring to be lifted from its seat 30. Upward movement of the relief valve ring 39, acting through the collar 32 and upper disk 49, causes an upward movement of the diaphragm 51 and associated washers 91 and 80 against the compressing forces of the springs 79 and 82. The unseating of the annular relief valve 39 provides a flow passage for fluid from the delivery side of the pump into the upper chamber 28 and then to the intake side of the pump through the passages 22 and 20. The pressure on the outlet side of the rotor 16 is thus relieved until a pressure below that for which the regulating mechanism is set is again reached, whereupon the relief valve ring 39 is caused to seat again under the action of the springs 79 and 82, as exerted through the diaphragm 51 and the washers 80 and 91.

In the event that the rotor 16 ceases to be driven and it is desired to by-pass fluid through the pump and valve assembly, any fluid under pressure entering the intake port 17 will flow upwardly through the passages 20, 22 into the upper chamber 28 and downwardly through the openings 43 to exert pressure against the by-pass disk 44, unseating said disk against the light spring action of the coiled spring 45. The fluid will then continue to flow downwardly through the passages 23 and 21 into the outlet 18 of the pump. Since the spring 45 is very light indeed, the amount of fluid pressure necessary to unseat the by-pass valve disk 44 from seating relationship with the under surface 40 of the relief valve ring 39 is almost negligible. Only a slight amount of downward displacement of the by-pass disk 44 is sufficient to provide an opening of comparatively large area, through which fluid may flow past said by-pass disk 44 to the outlet side of the pump.

As previously described, the provision of the segmental spherical surfaces 34 and 42 on the collar 32 and relief valve disk 39, respectively, in conjunction with the clearance 41 between said relief valve disk and the stem 31, permits said relief valve disk 39 to seat squarely upon the seating surface 30 surrounding the port 29, regardless of any slight cocking or misalignment of the stem 31. This is an important feature that insures quick closing of the relief valve and prevents undesirable leakage through the port 29.

In the modified form of my invention illustrated in Figure 3, there is shown a valve housing 100 having a general similarity to the valve housing 12, and adapted to be positioned between a pump casing 101 and a cover 102 for housing the pressure regulating mechanism (not shown). A diaphragm 103 is clamped at its periphery between the lower end of said cover 102 and the upper surface of the valve housing 100. It will be understood that a pressure regulating mechanism similar in principle to that illustrated in Figure 1 serves to impress the desired amount of downward pressure upon the central portion of the diaphragm 103.

The valve housing 100 is provided with an upwardly extending intake passage 104 and a downwardly extending outlet passage 105, between which is provided a port 106 having a peripheral plane seating surface 107. Said valve housing 100 is also provided with a coaxial lower cylindrical well portion 108.

The relief valve assembly illustrated in Figure 3 comprises a cup-shaped member 109, which may be suitably be formed from a stamping, having a lower closed cylindrical end 110 snugly fitting into the lower well 108, and an upper annular flange 111 slidably fitting into an upper cylindrical bore 112. The peripheral flange 111 and the lower cylindrical portion 110 serve as guides for the axial movement of the valve member 109. Said cup-shaped valve member 109 is provided with openings 112a in its lower cylindrical portion and with other openings 113 in its upper cylindrical portion. A shoulder 114 is formed between said upper and lower cylindrical portions and a ring 115 is positioned against said shoulder. Said ring 115 is provided with an external segmental spherical surface 116 for cooperation with a similarly contoured surface 117 formed in a relief valve ring 118.

Said relief valve ring 118 is provided with a lower plane face 119 for seating upon the plane surface 107 surrounding the port 106. The provision of the segmental spherical surfaces 116 and 117 insures a proper seating of said relief valve ring 118 upon the seating surface 107.

An inner ported valve member 120 is adapted to be positioned within the cup-shaped valve member 109 and to seat therein upon the opposite surface of the shoulder 114. The upper surface 121 of said inner valve member 120 is in contact with the under surface of the diaphragm 103. The pressure regulating mechanism, which may be similar in principle to that already described in connection with Figures 1 and 2, thus acts through the diaphragm 103 and the inner valve member 120 to urge the relief valve ring 118 into its normal seated position upon the seating surface 107.

The under surface 122 of said inner valve member 120 serves as a seat for a by-pass valve disk 123, which is spring urged thereagainst by means of a coiled spring 124 held under compression between said by-pass valve disk 123 and the bottom wall of the lower cylindrical portion 110 of the cup-shaped valve 109.

The operation of the modified form of device illustrated in Figure 3 is, in general, similar to that described in connection with the device illustrated in Figures 1 and 2. The relief valve ring 118 is unseated when the pressure of fluid on the outlet side of the pump and in the passage 105 exceeds that for which the pressure regulating mechanism is set. The fluid then flows upwardly through the passage 105 through the opened port 106, and through the ports or openings in the cup-shaped valve member 109 and the inner valve member 120, and downwardly through the passage 104 into the intake side of the pump.

The relief valve disk 118 seats again under the action of the pressure regulating mechanism as translated through the diaphragm 103 and inner valve member 120. In seating, the relief valve ring 118 is free to seat squarely with uniform pressure throughout the contacting area between the seating surfaces of said ring and the seating surface 107. The provision of the spherical surfaces 116 and 117 insures this proper seating action.

A further modified form of my invention illustrated in Figure 4 comprises a valve housing 125 having upper and lower chambers 126 and 127 with a port 128 therebetween formed by a horizontal partition 129. A passage 130 leads from the intake side of the pump to the upper chamber 126, and a passage 131 leads from the lower chamber 127 to the discharge side of the pump. A cylindrical valve rod or stem 132 is positioned in an axial bore 133 formed in the valve housing 125 and extends upwardly through the port 128. Said rod 132 serves as a guide for a valve member 134, which is slidably mounted upon said rod 132. Said valve member 134 has an upper annular flange 135 adapted to bear against the under side of a diaphragm 136.

The valve member 134 is also provided intermediate its length with an annular enlargement 136a having a lower segmental spherical surface 137. A relief valve ring 138 is freely mounted upon said valve member 134 and is provided with a conformingly contoured surface 139 for cooperating with the segmental spherical surface 137. Said relief valve ring 138 is provided with a plane lower surface 140 that is adapted to seat upon the plane upper surface 141 of the partition 129.

In the modified form of the invention illustrated in Figure 4, the provision of the cooperating segmental spherical surfaces 137 and 139 insures a self-alignment of the relief valve ring 138 and proper seating of said ring upon the seating surface 141. The operation of the relief valve in this modified form of the invention is, in general, similar to that already described.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A relief valve assembly comprising a casing providing a port, a valve member movable axially of said port, an annular valve element movable with said member and adapted normally to close said port, said member and element having associated therewith cooperating segmental spherical surfaces to permit relative tilting movement therebetween, and resilient means normally urging said surfaces into cooperative engagement and said valve element into seating relationship to close said port.

2. In a relief valve assembly, a ported casing having an intermediate annular plane shoulder defining a port, a cup-like relief valve member of lesser diameter than said port and movable axially in said port, a ring fittedly carried by said valve member and provided with an external segmental spherical seating surface, and a separate floating relief valve ring having a plane surface for seating against said shoulder and having a segmental spherical surface for cooperation with said external segmental spherical surface to provide for self-alignment of said valve in the seating movement thereof.

MICHELE CASERTA.

REFERENCES CITED

The following references are of record in the file of this patent:

UNITED STATES PATENTS

| Number | Name | Date |
|---|---|---|
| 1,240,682 | Crompton | Sept. 18, 1917 |
| 2,366,146 | Martin-Hurst | Dec. 26, 1944 |
| 2,375,076 | Caserta | May 1, 1945 |